(12) United States Patent
Linnartz (10) Patent No.: US 10,341,112 B2
(45) Date of Patent: Jul. 2, 2019

(54) SOFT GENERATION OF BIOMETRIC CANDIDATES AND REFERENCES BASED ON EMPIRICAL BIT ERROR PROBABILITY

(71) Applicant: KONINKLIJKE PHILIPS N.V., Eindhoven (NL)

(72) Inventor: Johan-Paul Maria Gerard Linnartz, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 287 days.

(21) Appl. No.: 15/126,496

(22) PCT Filed: Mar. 17, 2015

(86) PCT No.: PCT/EP2015/055556
§ 371 (c)(1),
(2) Date: Sep. 15, 2016

(87) PCT Pub. No.: WO2015/140167
PCT Pub. Date: Sep. 24, 2015

(65) Prior Publication Data
US 2017/0093576 A1 Mar. 30, 2017

(30) Foreign Application Priority Data
Mar. 21, 2014 (EP) .................................. 14161009

(51) Int. Cl.
*G06K 9/00* (2006.01)
*H04L 9/06* (2006.01)
(Continued)

(52) U.S. Cl.
CPC ............ *H04L 9/3231* (2013.01); *G06F 11/10* (2013.01); *G06F 21/32* (2013.01);
(Continued)

(58) Field of Classification Search
CPC ........ G06F 21/32; G06F 11/10; H04L 9/3231; H04L 9/0643; H03M 13/63;
(Continued)

(56) References Cited

U.S. PATENT DOCUMENTS

2006/0050937 A1 3/2006 Hamid
2007/0234067 A1* 10/2007 Nanavati ................. G06F 21/32
713/186

(Continued)

FOREIGN PATENT DOCUMENTS

| EP | 1410312 B1 | 1/2006 |
| WO | 2004104899 A2 | 12/2004 |
| WO | 2006129242 A2 | 12/2006 |

OTHER PUBLICATIONS

Bazen et al: "Likelihood-Ratio-Based Biometric Verification"; IEEE Transactions on Circuits and Systems for Video Technology, vol. 14, No. 1, Jan. 2004, pp. 86-94.

(Continued)

*Primary Examiner* — Kambiz Zand
*Assistant Examiner* — Benjamin A Kaplan (57) ABSTRACT

A biometric verification device is arranged to compare a reference hash with a verification bit string obtained from a biometric. The biometric verification device includes a candidate bit string generator arranged to generate candidate bit strings from the verification bit string and error probabilities; a hash unit arranged to apply a cryptographic hash function to the generated candidate bit strings to obtain candidate hashes; and a comparison unit arranged to verify if a candidate hash generated by the hash unit matches a reference hash.

16 Claims, 4 Drawing Sheets

(51) Int. Cl.
*H04L 9/32* (2006.01)
*G06F 11/10* (2006.01)
*G06F 21/32* (2013.01)
*H03M 13/00* (2006.01)
*G06K 9/62* (2006.01)
*H03M 13/15* (2006.01)

(52) U.S. Cl.
CPC ........ *G06K 9/00892* (2013.01); *H03M 13/63* (2013.01); *H04L 9/0643* (2013.01); *G06K 9/00087* (2013.01); *G06K 9/00288* (2013.01); *G06K 9/00597* (2013.01); *G06K 9/6255* (2013.01); *H03M 13/152* (2013.01)

(58) Field of Classification Search
CPC ............ H03M 13/152; G06K 9/00892; G06K 9/00087; G06K 9/00288; G06K 9/00597; G06K 9/6255
USPC ........................................................ 713/186
See application file for complete search history.

(56) References Cited

U.S. PATENT DOCUMENTS

| | | | |
|---|---|---|---|
| 2008/0178008 A1* | 7/2008 | Takahashi | G06F 21/32 713/186 |
| 2008/0209227 A1 | 8/2008 | Venkatesan et al. | |
| 2011/0185176 A1* | 7/2011 | Takahashi | G06F 21/32 713/168 |
| 2011/0260832 A1* | 10/2011 | Ross | G06F 21/32 340/5.84 |
| 2013/0219193 A1 | 8/2013 | Baughman et al. | |
| 2013/0259330 A1 | 10/2013 | Russo et al. | |

OTHER PUBLICATIONS

Chen et al: "Extracting Biometric Binary Strings With Minimal Area Under the FRR Curve for the Hamming Distance Classifier"; Signal Processing 91, pp. 906-918, 2011.
Chen et al: "Multi-Bits Biometric String Generation Based on the Likelihood Ratio"; First IEEE International Conference on Biometrics:Theory, Applications and Systems, Sep. 2007, pp. 1-6.
Dodis et al: "Fuzzy Extractors: How to Generate Strong Keys From Biometrics and Other Noisy Data"; Lecture Notes Computer Science, Springer 2004.
Juels et al: "A Fuzzy Vault Scheme"; Journal of Designs, Codes and Cryptography, vol. 38, Issue 2, Feb. 2006, pp. 237-257.
Juels et al: "A Fuzzy Commitment Scheme";Proceedings of the 6th ACM Conference on Computer and Communications Security, 1999, pp. 28-36.
Kelkboom et al: "Analytical Template Protection Performance and Maximum Key Size Given a Gaussian Modeled Biometric Source"; SPIE, Apr. 2010, pp. 1-12.
Linnartz et al: "New Shielding Functions to Enhance Privacy and Prevent Misuse of Biometric Templates"; Audio and Video-Based Biometric Person Authentication, Springer 2003, pp. 1-9.
Ratha et al: "Generating Cancelable Fingerprint Templates"; IEEE Transactions on Pattern Analysis and Machine Intelligence, vol. 29, No. 4, Apr. 2007, pp. 561-572.
Rathgeb et al: "A Survey on Biometric Cryptosystems and Cancelable Biometrics"; EURASIP Jounal on Information Security, 2011, 2011:3, pp.
Tuyls et al:"Practical Biometric Authentication With Template Protection"; Audio and Video-Based Biometric Person Authentication, Springer 2005, pp. 436-446.
Voloshynovskyy et al: "Information-Theoretical Analysis of Private Content Identification"; IEEE Information Theory Workshop, 2010, pp. 1-5.
Nakamura et al: "Experiment of Biometric Recognition by Hash Function"; Dept. of Computer Science, Gunma University , Feb. 28, 2003, vol. 2003,No. 18,pp. 245-250.

\* cited by examiner

SOFT GENERATION OF BIOMETRIC CANDIDATES AND REFERENCES BASED ON EMPIRICAL BIT ERROR PROBABILITY

CROSS-REFERENCE TO PRIOR APPLICATIONS

This application is the U.S. National Phase application under 35 U.S.C. § 371 of International Application No. PCT/EP2015/055556, filed on Mar. 17, 2015 which claims the benefit of European Patent Application No. 14161009.7, filed on Mar. 21, 2014. These applications are hereby incorporated by reference herein.

FIELD OF THE INVENTION

The invention relates to a biometric verification device and a biometric enrollment device.

BACKGROUND

The application of biometrics has become a popular solution for authentication or identification, often because of its convenience. However storage of biometric features introduces both security and privacy risks for the user, since this will make it easier for an adversary to misuse them. Security risks involved with storing biometric features include the reproduction of fake biometrics from the features, e.g. rubber fingers. Fake biometrics can be used to leave fake evidence at crime scenes or to obtain access to private information or services. Moreover, there are privacy concerns involved with storing biometric features. Some biometrics are known to reveal diseases and disorders of the user and unprotected storage allows for cross-matching between databases.

These problems cannot be solved with a simple encryption/decryption scheme, since we cannot trust the verifier. In many cases design specifications do not allow trusting a verifier. For example trusting a malicious verifier might result in user identities of people visiting that verifier being stolen and sold. Once biometric data has been compromised it is public forever and cannot be used in a security application anymore. Biometric data is inherently part of a user, e.g. one cannot change a user's fingerprints. It is desirable that the original features cannot be derived from whatever information is stored on the biometric.

Although, hashes are attractive because it is computationally infeasible to recover from the input of a cryptographic hash function from its output value, hash functions cannot be directly applied. In fact, the diffusion of the hash function makes it difficult to apply to (noisy) biometric data. The biometric features will be slightly different during each observation, thus the outputs of the two hash operations that depend on the biometric features will be unrelated. Applying a hash function to the measurements makes it impossible to do the verification based on similarity in the hashed domain.

One approach to correct the differences over the observations was done uses so-called helper data, i.e. auxiliary data to handle the errors between subsequent observations. Many constructions have been proposed, which all can be considered helper data schemes since they store user dependent data.

There are so-called digital and analog variants of helper data, referring to applications of helper data in error correcting codes and quantization phases respectively; analog helper data may well be digitally represented. This document also refers to digital and analog helper data as error-correcting helper data and quantization helper data, respectively.

1. Analog, such as Biased Quantization. This is may be interpreted as a user-dependent bias in the quantization of biometrics in the analog domain, i.e., before quantization. An example is given by the published international application WO/2004/104899, with title "Method And System For Authentication Of A Physical Object", by the same applicant and included herein by reference discloses a system for authenticating a physical object including an enrolment device and an authentication device.

2. Digital, such as Code shifting: During the verification, the quantified biometrics are "shifted" towards a valid code word. This shifting can be an exor (XOR) operation with a vector of low-hamming weight that shifts the extracted biometric to the nearest code word. This operation occurs fully in the digital domain. After this shift an error correcting code (ECC) can be applied. This can correct a certain, but limited number or errors. Typically codes can be effective if the bit error rate lies below say 10%. An example is given in "A fuzzy commitment scheme," by A. Juels and M. Wattenberg.

The above two methods may be combined in a two stage helper data system.

SUMMARY OF THE INVENTION

It would be advantageous to have an improved biometric system including a biometric verification and biometric enrollment device.

Tests on current biometric systems have revealed that the code rate of the error correction is far below any desirable value. Hence the biometric data loses a lot of its entropy, which jeopardizes the strength of the system, and in particular of any cryptographic applications. To some extent entropy loss is unavoidable: allowing more bit strings to match the enrollment bit strings implies smaller entropy. For example, considering biometric data of size n=63 bit, then the maximum capacity would give $2^n=2^{63}$ possible binary bit strings. If every biometric can potentially contain up to one-bit error, then every biometric needs to reserve a space of $n+1=63+1=64=2^6$ combinations. Thus there is an entropy loss of about $^2 \log(n)=6$ bits for a one-error correcting code word. Hence one can optimally pack $2^{63}/2^6=2^{57}$ different biometrics.

In an existing approach based on ECC: a biometric Y, obtained during a biometric verification, e.g. authentication, is shifted by error-correcting helper data towards a code word. This shift can be an XOR operation with a difference vector WD between a biometric enrollment bit string and a code word. During verification the same difference vector WD is applied to the biometric that is then sampled.

Yet the verification sample may not be exactly equal to the enrolment sample. Hence the WD vector may not map the biometric exactly on a code word. Some other errors may occur, but WD will likely shift the verification biometric to the bit string in the vicinity of the code word chosen during enrollment. A subsequent ECC operation on the shifted bit string corrects the errors, provided the error level is below the error correction capabilities of the code. The outcome of the ECC is hashed and compared to a so-called template, i.e., a hash obtained during biometric enrollment.

Below a number of options for the known BCH codes are given:

| Code length (n) | Number of correctable errors (t) | effective # bit remaining using a BCH code (k) |
| --- | --- | --- |
| 63 | 1 | 57 |
| 63 | 2 | 51 |
| 63 | 3 | 45 |
| 63 | 4 | 39 |
| 63 | 5 | 36 |
| 63 | 6 | 30 |
| 63 | 7 | 24 |
| 63 | 10 | 18 |
| 63 | 11 | 16 |
| 63 | 13 | 10 |
| 63 | 15 | 7 |

The table confirms that in this case of a 63 bit biometric every additional error correctable by ECC leads to an approximately loss of 6 bits in entropy. This rapidly jeopardizes the strength of the biometrics, e.g., to withstand exhaustive search.

A biometric verification device is proposed that is arranged to compare a reference hash with a verification bit string obtained from a biometric. The biometric verification device has access to error probabilities assigned to bits of the verification bit string. An error probability is indicative of a probability that the bit in the verification bit string corresponding to the error probability differs from a corresponding bit in an enrollment bit string.

The biometric verification device comprises a candidate bit string generator arranged to generate candidate bit strings from the verification bit string and the error probabilities. The error probabilities may be expressed as a likelihood, a log-likelihood, a distance, a posteriori probability estimation or other parameter that is indicative for the probability that a particular candidate string is the correct one.

Just generating multiple candidate bit strings already decreases entropy loss due to the need to correct for noisy biometric. Indeed, the chance of match between a verification and an enrollment bit string is increased because there are multiple candidates, but the entropy loss is minimized: there is no overhead from the error correcting code.

However, by using the error probabilities a much larger advantage is obtained. The error probabilities allow focused generation of candidate bit strings instead of flat generation of all possibilities. As a result fewer, candidate bit strings need to be generated to obtain a same level of error correction. Accordingly, there is less entropy lost. Moreover, an attacker would still have to exhaustively search the entire space, which in this example contains 2^63 possibilities, to find a match, whereas error correction coding would reduce his search space significantly.

The selection of which candidate bit string to generate is under the control of the error probabilities, increasing the probability that generated candidate bit string equal the enrollment bit string. A candidate bit string may be generated from the verification bit string by selecting one or more bits of the verification bit string and changing their values, i.e., flipping the selected bits. The selecting of bits in the verification bit string being determined from the error probabilities by the candidate bit string generator.

A biometric enrollment device is proposed arranged to generate reference hashes from an enrollment bit string obtained from a biometric. The biometric enrollment device comprises a reference hash generator arranged to generate multiple diversified enrollment bit strings from the enrollment bit string.

Generating multiple diversified enrollment bit strings has the advantage that error correction computation is reduced at the verifier. Moreover, the enroller may use error probabilities in generating the multiple diversified enrollment bit strings, thus reducing entropy loss.

These methods can also be applied to other features than the biometric features of the human or animal body. They can be used for any source of "noisy data". Recently the scientific literature on physical unclonable functions (PUFs) has created many examples of potential applications. DNA or other genetic information is also within scope. An example, in the case of DNA-based biometrics, the verification may be based on parts of the sequences, thus hashes may be stored on (possibly overlapping) substrings.

The verifier and enroller are electronic devices. They may be a mobile electronic device, such as a mobile phone.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code means stored on a computer readable medium for performing a method according to the invention when said program product is executed on a computer.

In a preferred embodiment, the computer program comprises computer program code means adapted to perform all the steps of a method according to the invention when the computer program is run on a computer. Preferably, the computer program is embodied on a computer readable medium.

A biometric verification device is provided arranged to compare a reference hash with a verification bit string obtained from a biometric, the biometric verification device comprising a candidate bit string generator arranged to generate candidate bit strings from the verification bit string and error probabilities, a hash unit arranged to apply a cryptographic hash function to said generated candidate bit strings to obtain candidate hashes, a comparison unit arranged to verify if a candidate hash generated by the hash unit matches a reference hash.

BRIEF DESCRIPTION OF THE DRAWINGS

These and other aspects of the invention are apparent from and will be elucidated with reference to the embodiments described hereinafter. In the drawings, FIG. 6b is schematic illustration of a processor system, It should be noted that items which have the same reference numbers in different Figures, have the same structural features and the same functions, or are the same signals. Where the function and/or structure of such an item has been explained, there is no necessity for repeated explanation thereof in the detailed description.

DETAILED DESCRIPTION OF EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

Figure 1A:
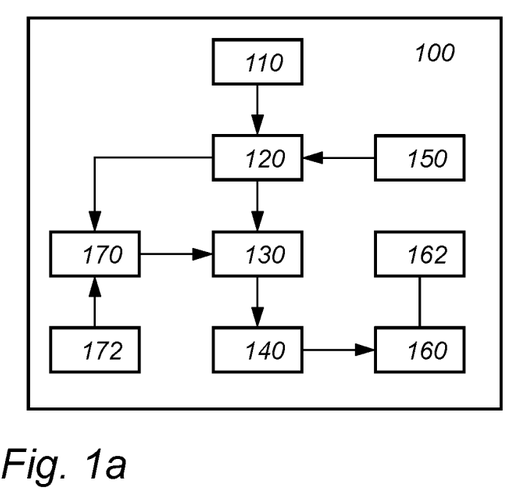
FIG. 1a is a schematic block diagram of a biometric verification device 100.

FIG. 1a is a schematic block diagram of a biometric verification device 100. Biometric verification device 100 is part of a biometric system that comprises a biometric enrollment device in addition to biometric verification device 100. Verification and enrollment devices may be combined into a single device.

Biometric verification device 100 is arranged to match a verification bit string that has been obtained from a biometric during a verification phase with a reference hash that was derived from the same biometric during an earlier enrollment phase by the biometric enrollment device.

A biometric is a feature of an individual that various across a population but which is sufficiently constant at least for a time period for a particular individual. Individuals are typically human individuals; However, the system may also be applied to animals, e.g., mammals, in particular domesticated animals such as pets and life stock. Biometric verification devices may be used for authentication; for example, access control, either physical access, e.g., to a building, or digital access, e.g., to a document or other content.

Figure 2A:
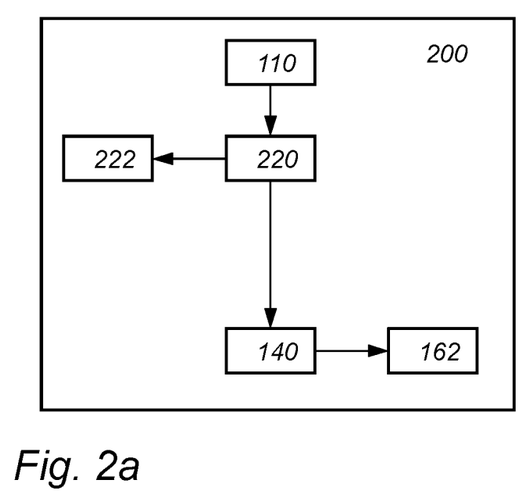
FIG. 2a is a schematic block diagram of a biometric enrollment device 200.

FIG. 2a is a schematic block diagram of a biometric enrollment device 200 that may be used with biometric verification device 100. Biometric enrollment device 200 comprises a biometric sensor 110, which is the same sensor or of the same type as the biometric sensor 110 of biometric verification device 100. Note that sensor 110 is optional, as biometric verification device 100 and/or biometric enrollment device 200 may comprise an input for receiving biometric verification and/or enrollment data.

Biometric sensor 110 is arranged to measure a biometric, the same biometric as will be used by biometric verification device 100. Suitable biometrics include: fingerprints, iris scans, facial measurements, and the like. More than one biometric may be used, for example multiple fingerprints, and/or facial measurements, etc.

Biometric sensor 110 produces the measurement in the form of biometric enrollment data. If the biometric is continuous, i.e., analog, biometric enrollment device 200 comprises a quantifier unit 220 to map the biometric enrollment data to digital data. If the biometric enrollment data is already of a discrete nature, quantization is not necessary, and quantizer unit 220 could be omitted.

Quantizer unit 220 is arranged to quantize the biometric verification data by mapping at least part of the biometric verification data to a point in a quantization range from a set of quantization ranges. To each quantization range in the set of quantization ranges a quantization bit string corresponds. For example, the quantization ranges may be numbered, preferably by a Gray code. The biometric verification data may comprise a one-dimensional value, and the ranges are consecutive and together partition the entire range the value may take.

Figure 3A:
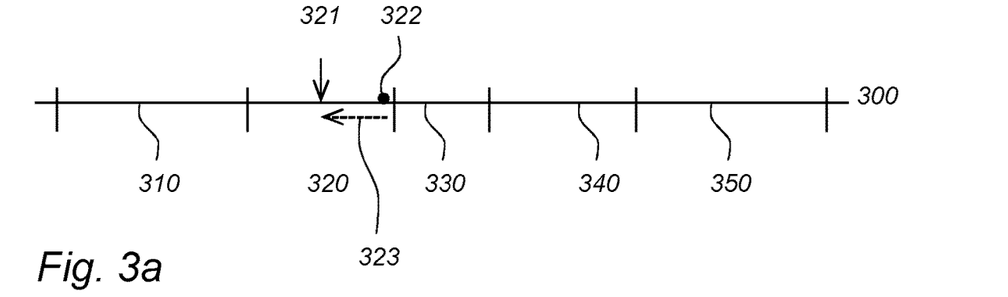
FIG. 3a is a graphic illustration is quantizing with respect to a set of quantization ranges during enrollment.

FIG. 3a illustrates quantization during enrollment. Shown is an axis 300 representing the value which is to be quantized. As an example, the value may be the distance between the eyes of an individual. Axis 300 is partitioned by a set of quantization ranges; shown are quantization range 310, 320, 330, 340 and 350. Note that not all quantization ranges need to be of the same size. Assigned to each range is a quantization bit string, for example for ranges 310, 320, 330, 340 and 350, the bit strings may be: 001, 011, 010, 110, and 111 respectively. The number of ranges and the particular bit strings assigned are only exemplary. Points on axis 300 represent values.

The range in which a value falls determines the quantization string assigned. In the case of point 322, falling in range 320 this would be 011. Optionally, biometric enrollment device 200 may produce quantization helper data. The quantization helper data may be computed by calculating the difference between the center of a quantization range and the value, e.g., the center of the range in which the value as measured lies. In this case, it may be center 321 minus value 322. The quantization helper data for point 322 has graphically been represented by arrow 323.

Quantization helper data may be stored in quantization helper data storage 222. Quantization may be performed for a number of values in the biometric enrollment data; optionally quantization helper data may be computed for one or more of the values. From the quantization bit strings that are thus obtained an enrollment bit string is obtained. The enrollment bit string may be combined with other data, e.g., password data, but this optional.

Starting from the enrollment bit string obtained from the biometric enrollment data, a reference hash is computed. Biometric enrollment device 200 comprises a hash unit 140 which is used to calculate a reference hash.

A reference hash allows a biometric verification device to verify if a verification bit string obtained from what is purportedly the same biometric is close enough to the enrollment bit string to trust that the individual that is measured at verification is the same as the individual at enrollment. What is required for this trust depends for a great deal on the security requirements of the application.

For example, the enrollment bit string may be hashed by hash unit 140 to obtain the reference hash. Biometric enrollment device 200 comprises a reference hash storage 162 for storing the reference hash produced by hash unit 140. There may also be intermediate steps between producing the enrollment bit string and the reference hash. For example, error-correcting helper data may be produced, as is more fully explained below.

The reference hash stored in reference hash storage 162 is communicated to biometric verification device 100 to allow biometric verification device 100 to perform a verification of the biometric; if quantization helper data is produced this is also communicated to biometric verification device 100. For example, biometric verification device 100 and biometric enrollment device 200 may be connected to a same computer network, such as the internet. For example, the owner of the biometric may have a mobile memory, say a smart card, storing the reference hash and in addition the quantization and/or error-correcting helper data.

Returning to FIG. 1a, the biometric verification device 100 as shown comprises a biometric sensor 110 which is the same or of the same type as biometric sensor 110 of biometric enrollment device 200. Biometric verification device 100 is arranged to measure said biometric to produce biometric verification data. Ideally, the biometric verification data would be identical to the biometric enrollment data produced by biometric enrollment device 200, but this is often not the case, and some amount of error will be present. Instead of a biometric sensor 110, biometric verification device 100 may also comprise an input for receiving the biometric verification data. In addition, biometric verification device 100 may comprise an input for receiving the reference hash or hashes, quantization and/or error-correction helper data, possibly even the quantization ranges, etc.

Biometric verification device 100 comprises a quantizer unit 120 arranged to quantize the biometric verification data by mapping at least part of the biometric verification data to a point in a quantization range from a set of quantization ranges. Quantizer unit 120 uses the same set of quantization ranges as quantizer unit 220. If quantization helper data is used, quantizer unit 120 first applies the helper data. For example, quantizer unit 120 may add the difference between an enrollment point and a quantization range center, using an arithmetical addition.

The verification bit string and the enrollment bit string often differ from each other. In fact enrollment bit strings obtained during different verifications by biometric verification device 100 will likely also differ from each other. Before quantizer unit 120 has mapped the quantization range which comprises the point that corresponds to the biometric verification data, quantizer unit 120 has information on bits in the verification bit string that are more likely to differ from the enrollment bit string than others.

Figure 3B:
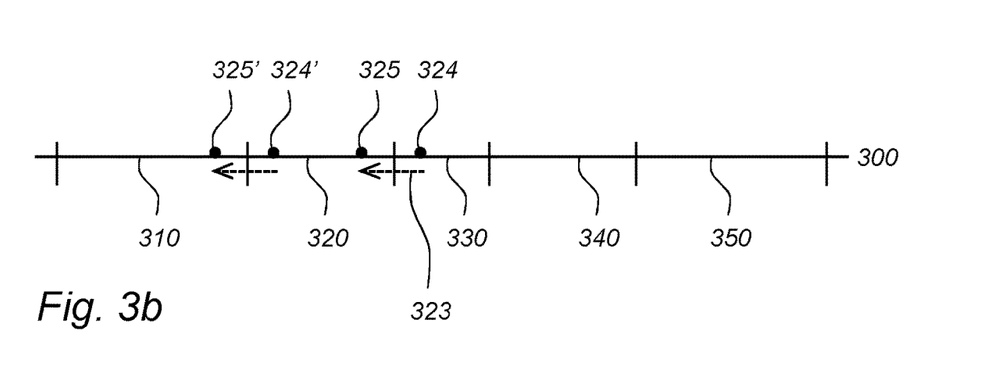
FIG. 3b is a graphic illustration is quantizing with respect to a set of quantization ranges during verification.

The quantization performed by quantizer unit 120 is illustrated in FIG. 3b. FIG. 3b uses the same quantization ranges, and the same corresponding bit strings. In this illustration the measurement of the biometric gave a bit larger value, this is represented by point 324. Without quantization helper data, point 324 would be mapped to the bit string corresponding to range 330; in this particular case 010 instead of 011. Note that the use of a gray code for numbering consecutive quantization ranges reduced the size of the error to a single bit. However, applying the quantization helper data moves point 324 to point 325, which falls in the correct range, and accordingly the correct bit string is applied.

Nevertheless, point 325 is close to the edge of range 320. This means that if point 324 had just been a little larger, than a different bit string would have been applied. In this example, point 324 was larger during verification, but it may just as well have been smaller. Consider, for example point 324' which shifts to point 325' after application of the quantization helper data. It can be seen that points which are close to edges in the quantization range are more likely to be erroneous than points which end up in the middle of a quantization range.

The use of quantization helper data will reduce errors during quantization on average, but will not eliminate them. Points close to edges, whether quantization helper data is used or not, are more likely to be erroneous.

Quantizer unit 120 is arranged to determine a distance between the point in the quantization range onto which the at least part of the biometric verification data is mapped and a closest edge of said quantization range and to assign an error probability to a corresponding bit in the verification bit string. In case of point 325, quantizer unit 120 is arranged to determine the distance between point 325 and the edge between ranges 320 and 330. In case of point 325', quantizer unit 120 is arranged to determine the distance between point 325 and the edge between ranges 310 and 320. A larger distance from the closest edge indicates a smaller error probability.

The error probability need not be exact, an indication of error probability is sufficient to improve error correction. For example, an error function may map the distance to a probability. The error function may depend on the distance of the point, e.g. point 325, to the closest edge and on the size of the range in which is lies, i.e., the size of range 320. An example function is: $p=\frac{1}{2}-$(distance of point to closest edge)/(size of quantization range in which point lies). This function maps the error probability to 0 for a point at the center and $\frac{1}{2}$ at the edge. A variant uses $a*(1-2p)+b*2p$, with p as above; wherein a is the overall average error probability, and b is the error probability for measurement at the edge of a quantization range. The values a and b may be determined experimentally; for example one may find that $a=0.1$ and $b=0.5$. Instead of probability, one may use likelihood, i.e., a logarithm of the probability; likelihood is indicative of probability. An error probability is indicative of a probability that the bit in the verification bit string corresponding to the error probability differs from a corresponding bit in an enrollment bit string.

Like quantizer unit 220, quantizer unit 120 is arranged to string together one or more quantization bit strings obtained by the quantizer unit from the biometric verification data to form the verification bit string, e.g. by concatenation. Error probabilities obtained by quantizer unit 120 are assigned to bits of the verification bit string. It is not necessary that all bits in the verification bit string have an assigned error probability, however, in an embodiment, all bits in the verification bit string have an assigned error probability. For example, bits may receive either a default error probability, say of 0.1, or a probability assigned by quantizer unit 120. Biometric verification device 100 may comprise an error probabilities storage; quantizer unit 120 is configured to store the error probabilities in error probabilities storage 170. Biometric verification device 100 has access to error probabilities storage 170 and to the error probabilities stored therein.

Quantizer unit 120 is not necessary in all embodiments. Moreover if quantizer unit 120 is present it need not be configured to derive error probabilities; for example, biometric verification device 100 may receive error probabilities from another source, e.g., obtained by the biometric enrollment device. Biometric verification device 100 may comprise an input 172 to receive error probabilities. Even if quantizer unit 120 is present and derives error probabilities, as is preferred, then biometric verification device 100 may have input 172. For example, biometric verification device 100 may combine received error probabilities with error probabilities derived by quantizer unit 120, e.g., by averaging them.

For example, biometric verification device 100 may comprise an error probability unit (not separately shown) configured to determine the error probabilities assigned to bits of the verification bit string from error probabilities determined by the quantizer unit and error probabilities received from the enrollment device.

Biometric verification device 100 comprises a candidate bit string generator 130 arranged to generate candidate bit strings from the verification bit string and the error probabilities. Instead of constructing just a single verification bit string, multiple candidate bits strings are generated. Regardless of preparations like carefully chosen quantization ranges, the use of quantization, etc., the single verification bit string likely still noisy making a lot of error-correcting helper data necessary. The candidate bit strings are close to the verification bit string but are chosen so that the probability that some one of the candidate bit strings is equal to the enrollment bit string is larger than the probability that the verification bit string equals the enrollment bit string. Thus error correction if needed at all, is needed less for the candidate bit strings.

Getting the probability that the verification bit string equals the enrollment bit string sufficiently high was previously done by using large amount of error correction. However, error correction decreases the dimension, of the data. If the number of errors to be corrected is even a few percent, say 5%, the decrease in entropy is considerable, and may be more than 25%; This is example is based on correcting 3 errors with a BCH code, having parameters n=63, k=45, and t=3. Using error probabilities in generating the candidate bit strings has a considerable advantage over using an error correcting code: an error correcting code assumes that all bits are equally likely to be wrong, however, this is not the case, as error probabilities may be available. Considering the BCH example above again, if it were known that 3 bits have an error and it is known which 3 bits have the error, a correct match can be established without any error correcting. Moreover the entropy loss would be exactly 3 bits, a loss of about 5%. Candidate bit string generator 130 will be further discussed below. Here entropy to amount of uncertainty in the bit string. High entropy implies that few individual will be mistaken for each other by chance. Higher entropy also implies that faking biometrics is harder.

Biometric verification device 100 further comprises a hash unit 140 arranged to apply a cryptographic hash function to said generated candidate bit strings to obtain candidate hashes. A cryptographic hash function has the property that it is computationally infeasible to generate a bit string that would result in a given hash; thus the biometric enrollment data from the biometric sensor cannot be derived from a hash value. A cryptographic hash function also has the property that it is computationally infeasible to generate two bit strings that would result in the same hash; thus the hashes have the same power to distinguish individuals as the original biometric data has. Examples of cryptographic hash functions include Sha-3, Sha-2, Sha-256, Skein, and Keccak; Other NIST Secure Hash Standard candidates may also be used.

Biometric verification device 100 comprises a reference storage 162 arranged to store at least one reference hash. For example, the at least one reference hash may have been obtained by the enrollment device, such as biometric enrollment device 200, from the enrollment bit string using the same cryptographic hash function as hash unit 140 of biometric verification device 100.

Biometric verification device 100 comprises a comparison unit 160 arranged to verify if a candidate hash generated by the hash unit matches a reference hash stored in the reference storage. For example, comparison unit 160 may compare each one of the generated candidate hashes with each one of the stored reference hashes. As a cryptographic hash function is used, the comparison requires equality for a match. If a match is found this is proof that the biometric measured during verification was the same as the biometric measured during enrollment.

Quantization helper data storage 150, reference hash storage 162 and error probabilities storage 170 may be implemented as electronic memories, e.g., volatile or non-volatile memory, e.g. flash or ram memory; one or more of them may also be implemented as magnetic or optic memory.

Reference storage 162 may store multiple references hashes. The enrollment device may also produce multiple variants of the enrollment bit string using error probabilities. The error probabilities obtained by an enrollment device do not use distance to closest quantization range edge. Instead an enrollment device has access to other sources of information. For example, an enrollment device may perform multiple measurements using biometric sensor 110 and derive the variability in each bit of the measurement. The multiple measurements may be for the particular individual that is being enrollment or may be for a population, e.g., based on a sample of the population. For example, standard deviation is a measure for variability. High variability gives a higher error probability. The enrollment device may be arranged to apply a function to map variability to error probability.

After a sufficient number of individuals have enrolled, the enrollment device has data to analyze for variability. Large variability may be used to adapt quantization ranges, but this may not be possible. For example, quantization ranges may be fixed, e.g., by a standard or by the sensor. Also the data may be of discrete nature, not suitable for quantization. The error probabilities obtained by analyzing a biometric enrollment data of a number of enrolled individual may be used to generate diversified enrollment bit strings. The error probabilities may also or instead be communicated to a biometric verification device.

Returning to candidate bit string generator 130 in FIG. 1a. There are a number of ways in which candidate bit string generator 130 may produce multiple candidate bit strings.

For example, candidate bit string generator 130 may be arranged to generate candidate bit strings having a total error probability less than an error probability threshold. The total error probability being determined from the error probabilities assigned to bits of the verification bit string. Candidate bit string generator 130 may be configured to only generate candidate bit strings having a total error probability less than the error probability threshold and/or to generate all bit strings having a total error probability less than the error probability threshold.

In an embodiment of biometric verification device 100 this may work as follows. In order to match a captured noisy digital verification bit string $Y=(y_1, y_2, \ldots, y_N)$ of length N, biometric verification device 100 not only matches a hashed valued $S'=H(Y)$ against the template S, i.e., a reference hash S, but also an appropriately chosen set of near-matched $\hat{Y}$, such that $\hat{Y}=Y \oplus E$, where E is an error string and $\oplus$ a bit-wise XOR. That is, comparison unit 160 also tests whether $\hat{S}=H(\hat{Y})=S$ The E vectors are chosen on the basis of the error probabilities; preferably error probabilities derived by quantizer unit 120. Thus only a set of unreliable bits are tested. For example, the biometric verification device 100 may tests all possible biometrics that have a posterior likelihood larger than a certain threshold value (e.g. of 1%). Preferably candidate bit string generator 130 starts with the most likely sequence and continues step by step with increasingly lower likelihood.

It is possible not to use error probabilities, e.g., to generate all candidate bit string for which the E vectors have a given Hamming weight, say a weight of 1. For some error correcting codes this may give a small advantage over using an error correcting code, in terms of entropy reduction. For example, instead of the n=63, k=45, t=3 BCH code, one could generate all E vectors of hamming weight 3. The resulting entropy: 63−log(2, sum (i=0 . . . 3, binomial (63, i)))=47.7 which is slightly higher than 45. This advantage is obtained because most codes, like BCH codes, do not achieve the hamming bound, i.e., are not perfect codes. However, using error probabilities, the bits that are likely to be faulty can be specifically targeted. This means that the remaining entropy may be much larger; each additional information on the error probabilities increases the entropy upwards from 47.7.

Generating all candidate bits strings that have a total error probability above some error threshold, say of 1%, may be hard on computationally restricted hardware, such as mobile hardware, such as mobile phones. Simplified systems are proposed that decrease the computational burden yet attain most of its advantages.

For example, the candidate bit string generator may be arranged to select a selection-number of bits in the verification bits string that have the largest assigned error probability. The higher the 'selection-number' is chosen the more candidate bit strings will be generated; the probability for a match increases if the selection-number increases, the resulting entropy decreases. It is envisioned that the selection-number will be relatively small, say less than 10. In embodiments, the selection-number is 1, or the selection-number is 2, or the selection-number is 3.

Candidate bit string generator 130 may be arranged to candidate bit strings in which the values of said selected bits are varied. Candidate bit string generator 130 will generate 2^(selection number) of bit strings, or less if a match has been found earlier. For example, if the selection-number is 3 and bits i, j, and k have the highest assigned error probabilities, candidate bit string generator 130 may generate candidate bit strings by changing the values of bits i, j, and k to all 2^3=8 possibilities, thus 8 candidate bit strings can thus be generated.

Even though candidate bit string generator 130 generates multiple candidate bit strings taking error probabilities into account it may unfortunately, still happen that none of the generated candidate bit strings produce a candidate hash that matches a reference hash in reference hash storage 162. This may be addressed by adding error correction, e.g., using error-correction helper data. It is noted, that the amount of error correction needed is much lower when multiple candidate bit string are produced.

For this purpose biometric verification device 100 may comprise an error correction unit 134 arranged to apply an error correcting algorithm to a bit string. Reference hash storage 162 may be arranged to store the at least one reference hash with error-correcting helper data corresponding to the reference hash. Candidate bit string generator 130 may be arranged to use error-correction helper data. An embodiment of candidate bit string generator 130 that uses error-correcting helper data is candidate bit string generator 131 shown in FIG. 1b.

Figure 1B:
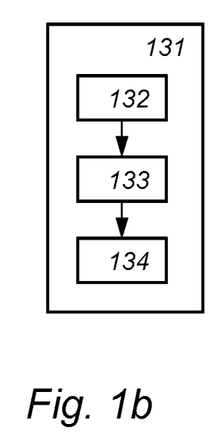
FIG. 1b is a schematic block diagram of a candidate bit string generator 131.

FIG. 1b is a schematic block diagram of a candidate bit string generator 131.

Candidate bit string generator 131 comprises an intermediate bit string generator 132 arranged to generate intermediate candidate bit strings from the verification bit string and the error probabilities. This may use the same methods as disclosed above; for example, a number of high bits may be identified with high error probability, the intermediate candidate bit strings are obtained by varying these bits in the verification bit string.

Candidate bit string generator 131 comprises an error-correcting helper data application unit 133. Error-correcting helper data application unit is arranged to shift the intermediate candidate bit strings towards a code word of an error correcting code by applying error-correcting helper data to the intermediate candidate bit string. Finally, error-correcting unit is applied to the shifted intermediate candidate bit strings to obtain the candidate bit strings. Typically, an error correcting algorithm applied to a shifted intermediate candidate bit string will obtain a code word. There are at least two different options to proceed starting from the recovered code word. Hash unit 140 may be applied to the code word directly. The original enrollment bit string may be recovered from the code word, and hash unit 140 may be applied to that, or the data part (corresponding to the code space with dimension 'k') be extracted and hash unit 140 may be applied to that part.

For example, error-correcting helper data application unit 133 may xor the helper data to the intermediate bit string.

Finally, comparison unit 160 is arranged to for verifying if a candidate hash generated by the hash unit matches a reference hash corresponding to the error-correcting helper data applied to the intermediate candidate bit string from which the candidate hash was obtained.

In fact, reference hash storage 162 may be arranged to store multiple references hashes along with multiple corresponding helper data. In this case, all combination of helper data and intermediate candidate bit strings are tried. This means that the number of candidate bit string equals the product of the number of helper data/reference hashes and intermediate candidate bit strings.

A candidate hash is compared to the reference hash that corresponds to the error-correcting helper data that was used to generate the corresponding candidate.

Figure 2B:
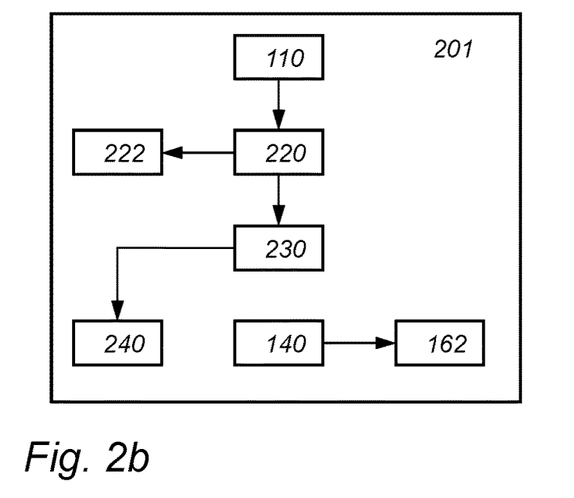
FIG. 2b is a schematic block diagram of a biometric enrollment device 201.

FIG. 2b is a schematic block diagram of a biometric enrollment device 201. Biometric enrollment device 201 comprises a reference hash generator arranged to generate multiple diversified enrollment bit string from the enrollment bit string.

For example biometric enrollment device 201 may have an error-number, and reference hash generator 230 may be configured to generate all diversified enrollment bit string that differ at most error-number of bits with the enrollment bit string. The error-number is typically small, say smaller than 10. In an embodiment the error-number is 1, or the error-number is 2, the error-number is 3.

Biometric enrollment device 201 comprise a hash unit 140 arranged to obtain multiple reference hashes from the multiple diversified enrollment bit string and a cryptographic hash function. For example, hash unit 140 may hash each one of the multiple diversified enrollment bit string to obtain the multiple reference hashes. Biometric enrollment device 201 comprises a reference hash storage 162 arranged to store the multiple reference hashes.

Biometric enrollment device 201 is arranged to make the multiple reference hashes available to a biometric verification device, e.g., biometric verification device 100. For example, biometric enrollment device 201, may comprise a reference hash storage 162 that may be portable, e.g., detachable from biometric enrollment device 201 for transport to a biometric verification device. Reference hash storage 162 may be a smart card, e.g., carried by the owner of the biometric. Biometric enrollment device 201 may comprise a wired or wireless interface to a computer network, e.g., the internet, for transferring the reference hashes to the biometric verification device.

In devices 100, 200, or 201, part of all of the storages may be combined into a single storage, e.g. a single electronic memory.

Through the generation of multiple reference hashes an error correcting code may no longer be necessary. This is advantageous since it avoids the need to have an error correcting algorithm at the biometric verification device 100. Many error-correcting algorithms require strong computational resources. For example, decoding a BCH code for example may use the Berlekamp-Massey algorithm which requires algebraic manipulations. By generating diversified enrollment bit strings at the enroller side, this error correcting may be avoided at the verifier. Even if some amount of error correcting is retained at the verifier, strong error correcting algorithms, like BCH, may be avoided and instead a weaker error correcting algorithms, like Hamming codes, may be used.

In an embodiment, the biometric enrollment device has access to error probabilities assigned to bits of the enrollment bit string. The reference hash generator 230 is arranged to generate multiple diversified enrollment bit string from the enrollment bit string and the error probabilities. Implementing reference hash generator 230 may use candidate bit string generator 130 for this purpose; the difference is that the origin of the error probabilities in biometric enrollment device 201 may be different, e.g., obtained from multiple measurements by biometric sensor 110 instead of quantizer unit 120.

Biometric enrollment device 201 shown in FIG. 2b further comprises an error-correcting helper data generator 240 arranged to select a code word of an error correcting code for a diversified enrollment bit string, and determine error-correcting helper data for shifting the diversified enrollment bit string towards said selected code word. If no error-correcting helper data is used, error-correcting helper data generator may be omitted. An error correcting code is defined as a set of all code words, i.e., a subset of $Z_2^n$ having a minimum distance of at least 3. Associated with the error correcting code is an error correcting algorithm that maps a bit string to a closest code word, i.e., an element of the subset.

Error-correcting helper data generator may work as follows. Given a diversified enrollment bit string of n bits. A code word is selected from an error correcting code in which the code words have n bits or more. The XOR difference between the selected code word and the diversified enrollment bit string is the error correcting helper data. Other forms of error-correcting helper data are known. Hash unit 140 may act on the selected code word, or on the diversified enrollment string, etc.

The devices 100, 200, 201 may each comprise a microprocessor (not shown) which executes appropriate software stored at the device; for example, that software may have been downloaded and/or stored in a corresponding memory, e.g., a volatile memory such as RAM or a non-volatile memory such as Flash (not shown). Alternatively, the devices 100, 200, 201 may, in whole or in part, be implemented in programmable logic, e.g., as field-programmable gate array (FPGA). Devices 100, 200 and 201 may be implemented, in whole or in part, as a so-called application-specific integrated circuit (ASIC), i.e. an integrated circuit (IC) customized for their particular use.

Figure 3C:
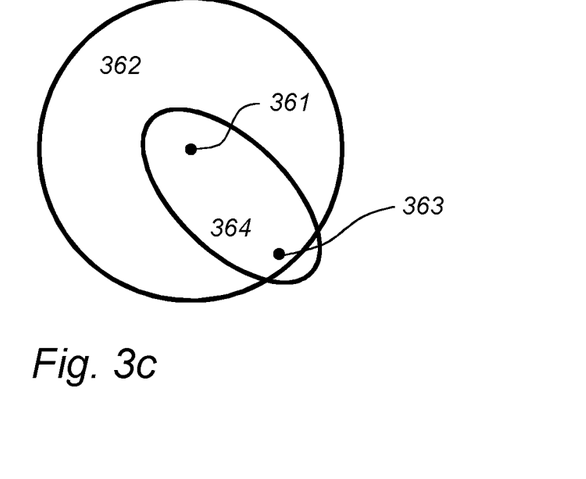
FIG. 3c is a graphic illustration of candidate bit string generation using error probabilities.

FIG. 3c is a graphic illustration of candidate bit string generation using error probabilities.

Shown is an enrollment bit string 363 and a verification bit string 361. These bit strings are not equal. The space 362 around verification bit string 361 represents the bit strings that need to be generated if not error probabilities were taken into account. The area of space 362 is represents the entropy loss. Searching through this space could be achieved through error correction, or by generating all bit strings within a predetermined hamming weight. Although these two options will not give precisely the same entropy loss it is clear that both of them lose a lot of entropy to cover part of the search space which is irrelevant. Space 364 shows candidate generation using error probabilities, only candidate bit strings are generated that have a chance of being the correct enrollment bit string. The resulting entropy loss is smaller.

A further example of a biometric which may be used is genetic information in the form of DNA. In the case of DNA-based biometrics, the verification may be based on parts of the sequences, the candidate and reference hashes may be obtained from, possibly overlapping, substrings of the DNA of the individual.

For example, the biometric sensor may comprise a nanopore set in an electrically resistant membrane bilayer. An ionic current is passed through the nanopore by setting a voltage across this membrane. The nanopore may be may be biological, e.g., formed by a pore-forming protein in a membrane such as a lipid bilayer; solid-state, e.g., formed in synthetic materials such as silicon nitride or graphene; or hybrid, e.g., formed by a pore-forming protein set in synthetic material.

A characteristic disruption in current passing through the nanopore is observed if a molecule passes through the pore. By measuring the current-disruption and comparing said measured current-disruption to predetermined characteristic disruptions, e.g., by correlation, the molecule may be classified, or even identified. In particular for DNA, partial substring of DNA may be sequenced.

An embodiment of the invention is a privacy preserving DNA matching system. The system wherein reference hashes are hashed versions of partial DNA strings. Said partial DNA strings are not the full DNA sequences, but sub substrings of length sufficient to identify the individual to a desired resolution. The embodiment uses a sensor for detecting G, A, T or C bases in a DNA string, e.g., comprising the nanopore, Interestingly, no quantifier and no quantizing helper data is required, either in the enroller or verifier.

Figure 4A:
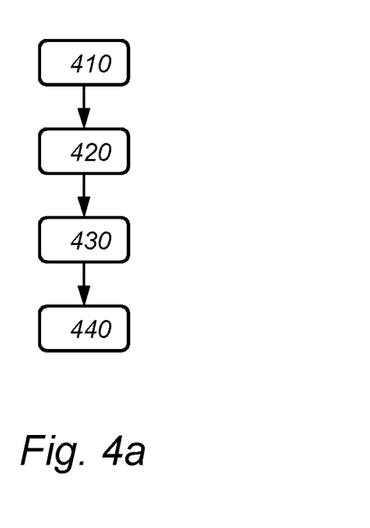
FIG. 4a is a graphic illustration of some data dependencies in a biometric verification device.

FIG. 4a is a graphic illustration of some data dependencies in a biometric verification device, such as biometric verification device 100. During operation biometric sensor 110 produces biometric verification data 410. The biometric verification data may be of analog, i.e., continuous nature. Biometric verification data 410 is quantized to obtain a verification bit string 420, e.g., by quantizer unit 120. The quantization may use quantization helper data, and may produce error probabilities assigned to the bits of verification bit string 420. Using verification bit string 420 and error probabilities multiple candidate bit strings candidate bit string 430 are generated. Biometric verification device 100 produces at least one candidate hash 440 for each one the candidate bit strings. A candidate hash is compared to a reference hash stored in reference hash storage 162. For example, a candidate bit string 430 may be hashed by hash unit 140 to obtain a candidate hash 440.

Figure 4B:
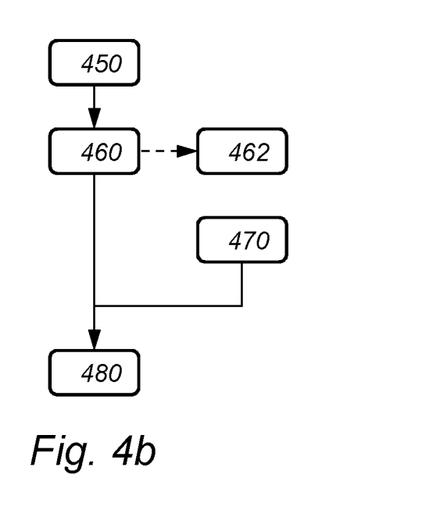
FIG. 4b is a graphic illustration of some data dependencies in a biometric enrollment device.

FIG. 4b is a graphic illustration of some data dependencies in a biometric enrollment device, such as biometric enrollment device 200 or 201. During operation biometric sensor 110 produces biometric enrollment data 450. The biometric enrollment data may be of analog, i.e., continuous nature. Biometric enrollment data 450 is quantized to obtain an enrollment bit string 460, e.g., by quantizer unit 220. Biometric sensor 110 may additionally produce error probabilities.

The quantization may produce quantization helper data. In addition, diversified enrollment bit string 462 may be generated. Generating diversified enrollment bit string 462 may or may not use error probabilities. For example, diversified enrollment bit string 462 may be produced by varying a fixed number of bits, e.g., the hamming weight between each diversified enrollment bit string 462 and the enrollment bit string 460 may be below a bound.

If error-correcting helper data is used, a code word 470 may be selected. If multiple diversified enrollment bit string 462 are used, a corresponding number of code words 470 may be selected. The selection of codeword may be random from the error correcting code.

Finally, a reference hash 480 is computed for the enrollment bit string or multiple reference hashes 480 are computed for each diversified enrollment bit string.

If helper data is used, helper data is determined from the (diversified) enrollment bit strings and the code word. In this case, reference hashes 480 may depend on the code word only, and not on an enrollment bit string.

It was found that in a practical biometric verification the probability of errors is very unevenly distributed over the dimensions of the biometric. Information about "where the errors are" is available a priori and a posteriori.

A priori: During enrolment it may be known that certain dimensions (certain bits) are more prone to errors than others. This may depend on the user.

A posteriori: based on soft decision information during verification, i.e., before hard quantizing, one may see that certain samples lies closer to quantization boundaries than others. Bits extracted from such dimension are more likely to contain errors than bits extracted from dimensions where the sample lies in the middle of a large quantization intervals.

During verification the verifier checks a set of likely bit patterns, exploiting information on likely error locations. This method has small advantages for ECC on, say, 63 bits without using information on errors: searching for random error locations requires 63+1 attempts for a one-bit—error tolerating search, and 1+63+63*62/2 attempts for a two-bit—error tolerating search. Yet if the verifier has knowledge on which bits are unreliable, a lot is gained.

An example can illustrates this principle: Consider that the verifier determines which three bits are most likely to contain an error. He tries all 8 (=2 to the power 3) combinations of potentially wrong bits. In such case he may be able to tolerate three bit errors by smart trial and error, without incurring the entropy loss of 3 bit ECC, which would have reduced the entropy of a 63 bit biometric to 45 bits effectively.

As the verifier accepts 8 different bit strings, the user capacity reduced to $2^{(63-3)}$ or 60 bits. An attacker, who is just operating on data base template data would still need an exhaustive search over $2^{63}$ bit combinations, such that the effective secrecy entropy remains 63 bits while an ECC scheme would only deliver 45 bits of secrecy entropy.

Improvement is also possible during enrolment. For example, an enroller may store a set of hash values (instead of one hash) taken from a set of likely bit patterns. During verification, the verifier may accept a match with any of the hash values.

Alternatively, the enroller may release error probabilities. For example, these may indicate that for a particular user a certain dimension is unreliable. Yet such scheme leaks private information about this user ("peggy gives unreliable body height values"). It is more secure not to reveal which bits are unreliable, but to store multiple hashed values, all of which may be accepted. The latter reveals information on the amount of uncertainty in the biometric but does not reveal any information on which bits are more or less prone to error.

As pointed out above methods may be combined. As an example, the enroller may determine for every newly enrolled person the two most likely locations of bit errors. The number of two is arbitrary, and may be any small number, say a number less than 10. We assume the system applies code shifting and a one-bit ECC. The enroller then generates the 2^two different bit strings and for each of these strings, applies a code shift and the ECC. The enroller stores the hash value for every ECC string.

That is, the helper data for any user p is:

Analog Helper data $WA_p$, first Code shift $WD_{1,p}$ and hash $H_{1,p}$ applied on original biometric Analog Helper data $WA_p$, second Code shift $WD_{2,p}$ and hash $H_{2,p}$ applied on original biometric with intentional error on the most likely dimension Analog Helper data $WA_p$, third Code shift $WD_{3,p}$ and hash $H_{3,p}$ applied on original biometric with intentional error on the second most likely dimension Analog Helper data $WA_p$, fourth Code shift $WD_{4,p}$ and hash $H_{4,p}$, applied on original biometric with intentional errors on the first and second most likely dimension The verifier may extract the biometric and test this with the above 4 available verification data sets.

Figure 5A:
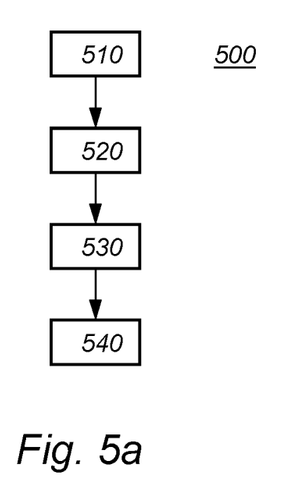
FIG. 5a is a schematic flow chart of a biometric verification method 500.

FIG. 5a is a schematic flow chart of a biometric verification method 500. Method 500 matches a reference hash with a verification bit string obtained from a biometric. Method 500 comprises:

Accessing 510 error probabilities assigned to bits of the verification bit string, an error probability being indicative of a probability that the bit in the verification bit string corresponding to the error probability differs from a corresponding bit in an enrollment bit string, the enrollment bit string having previously been obtained by a biometric enrollment device from said biometric. For example, this may be done by quantizer unit 120.

Generating 520 candidate bit strings from the verification bit string and the error probabilities. For example, this may be done by candidate bit string generator 130.

Applying 530 a cryptographic hash function to said generated candidate bit strings to obtain candidate hashes. For example, this may be done by hash unit 140.

Verifying 540 if a candidate hash generated by the hash unit matches a reference hash stored in a reference storage, the reference storage storing at least one reference hash, the at least one reference hash being obtained by the enrollment device from the enrollment bit string and said cryptographic hash function. For example, this may be done by comparison unit 160.

Figure 5B:
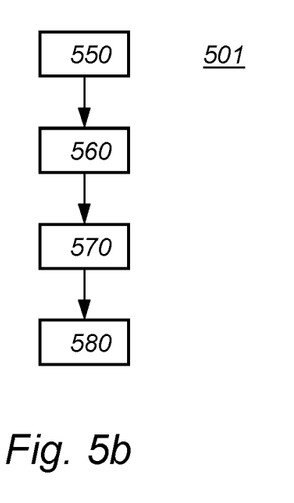
FIG. 5b is a schematic flow chart of a biometric enrollment method 501.

FIG. 5b is a schematic flow chart of a biometric enrollment method 501. Method 501 generates reference hashes from an enrollment bit string obtained from a biometric. Biometric enroller method 501 comprises:

Generating 550 multiple diversified enrollment bit string from the enrollment bit string, Obtaining 560 multiple reference hashes from the multiple diversified enrollment bit string and a cryptographic hash function, and Storing 570 the multiple reference hashes.

In addition, method 501 may also comprise one or more of the following:

Accessing error probabilities assigned to bits of the enrollment bit string,

Generating multiple diversified enrollment bit string from the enrollment bit string and the error probabilities, Selecting a code word of an error correcting code for a diversified enrollment bit string, and determining error-correcting helper data for shifting the diversified enrollment bit string towards said selected code word.

Many different ways of executing methods 500 and 501 are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, phases 550 and 560 may be executed, at least partially, in parallel. Moreover, a given step may not have finished completely before a next step is started.

A method according to the invention may be executed using software, which comprises instructions for causing a processor system to perform method 500 or 501. Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform a method according to the invention.

Figure 6A:
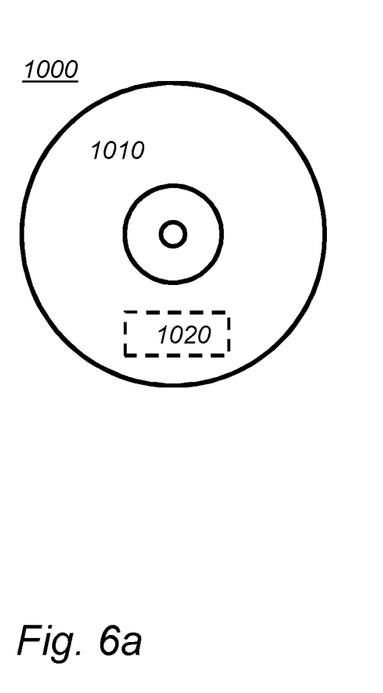
FIG. 6a is schematic illustration of a computer readable medium.

FIG. 6a shows a computer readable medium 1000 having a writable part 1010 comprising a computer program 1020, the computer program 1020 comprising instructions for causing a processor system to perform a biometric verification method for comparing a reference hash with a verification bit string obtained from a biometric or a biometric enroller method for generating reference hashes from an enrollment bit string obtained from a biometric, according to an embodiment.

The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown in FIG. 7a as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform one of said methods.

Figure 6B:
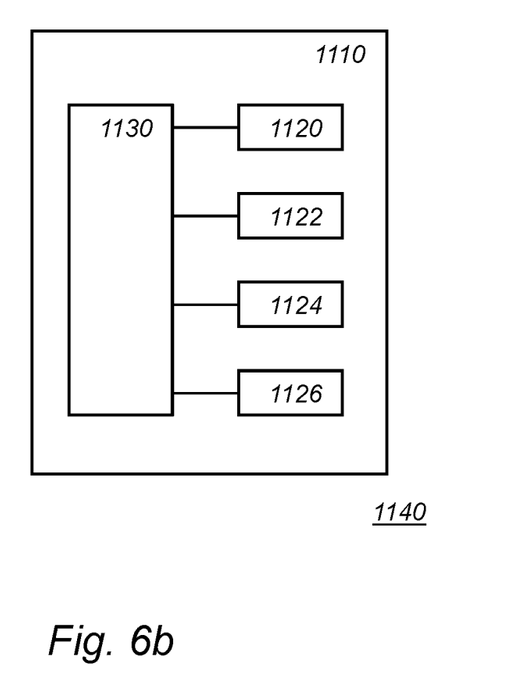

FIG. 6b shows in top-view a schematic representation of a processor system 1100 according to the invention. The processor system comprises one or more integrated circuits 1110. The architecture of the one or more integrated circuits 1110 is schematically shown in FIG. 7b. Circuit 1110 comprises a processing unit 1120, e.g. a CPU, for running computer program components to execute a method according to the invention and/or implement its modules or units.

Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

It should be noted that the above-mentioned embodiments illustrate rather than limit the invention, and that those skilled in the art will be able to design many alternative embodiments.

Advantageous embodiments for biometric verification are set out in the following clauses. The Applicants hereby give notice that new claims may be formulated to such clauses and/or combinations of such clauses and/or features taken from the description, during prosecution of the present application or of any further application derived therefrom.

1. A biometric verification device (100) arranged to compare a reference hash (480) with a verification bit string (420) obtained from a biometric, the biometric verification device having access to error probabilities (170) assigned to bits of the verification bit string, an error probability being indicative of a probability that the bit in the verification bit string corresponding to the error probability differs from a corresponding bit in an enrollment bit string, the enrollment bit string having previously been obtained by a biometric enrollment device from said biometric, the biometric verification device comprising a candidate bit string generator (130) arranged to generate candidate bit strings (430) from the verification bit string and the error probabilities, a hash unit (140) arranged to apply a cryptographic hash function to said generated candidate bit strings to obtain candidate hashes, a reference storage (162) arranged to store at least one reference hash, the at least one reference hash being obtained by the enrollment device from the enrollment bit string and said cryptographic hash function, a comparison unit (160) arranged to verify if a candidate hash generated by the hash unit matches a reference hash stored in the reference storage.

2. A biometric verification device as in Clause 1 arranged to obtain biometric verification data from a biometric sensor (110), the biometric sensor being arranged to measure said biometric, the biometric verification device comprising a quantizer unit (120) arranged to quantize the biometric verification data by mapping at least part of the biometric verification data to a point in a quantization range from a set of quantization ranges, a quantization range in the set of quantization ranges corresponding to a quantization bit string, the biometric verification device being arranged to string together one or more quantization bit strings obtained by the quantizer unit from the biometric verification data to form the verification bit string, wherein the quantizer unit is further arranged to determine a distance between the point in the quantization range onto which the at least part of the biometric verification data is mapped and a closest edge of said quantization range and to assign an error probability to a corresponding bit in the verification bit string.

3. A biometric verification device as in Clause 2, wherein the quantizer unit is arranged to apply quantization helper data to the at least part of the biometric verification data before mapping the at least part of the biometric verification data to the point in the quantization range.

4. A biometric verification device as in any one of the preceding clauses, wherein the biometric verification device has an input (172) to receive error probabilities obtained by the biometric enrollment device.

5. A biometric verification device as in any one of the preceding clauses, wherein the candidate bit string generator is arranged to generate candidate bit strings having a total error probability less than an error probability threshold, the total error probability being determined from the error probabilities assigned to bits of the verification bit string.

6. A biometric verification device as in any one of the preceding clauses, wherein the candidate bit string generator is arranged to select a selection-number of bits in the verification bits string that have the largest assigned error probability, and to generate candidate bit strings in which the values of said selected bits are varied.

7. A biometric verification device as in Clause 6, wherein
  the selection-number is 1, or
  the selection-number is 2, or
  the selection-number is 3.

8. A biometric verification device as in any one of the preceding clauses, wherein
  the reference storage is arranged to store the at least one reference hash with error-correcting helper data corresponding to the reference hash,
  the biometric verification device comprises an error correcting unit arranged to apply an error correcting algorithm to a bit string,
  the candidate bit string generator is arranged to
  generate intermediate candidate bit strings from the verification bit string and the error probabilities, shift the intermediate candidate bit strings towards a code word of an error correcting code by applying error-correcting helper data to the intermediate candidate bit strings, applying the error correcting unit to said shifted intermediate candidate bit strings to obtain the candidate bit strings, and
  the comparison unit is arranged to for verifying if a candidate hash generated by the hash unit matches a reference hash corresponding to the error-correcting helper data applied to the intermediate candidate bit string from which the candidate hash was obtained.

9. A biometric verification device as in any one of the preceding clauses, wherein
  the reference storage is arranged to store multiple references hashes, the multiple reference hashes being obtained by the enrollment device.

10. A biometric verification device as in the combination of clause 8 and 9, wherein the reference storage is arranged to store the multiple references hashes with multiple corresponding error-correcting helper data.

11. A biometric enroller device (200) arranged to generate reference hashes from an enrollment bit string obtained from a biometric, the biometric enroller device comprising
  a reference hash generator arranged to generate multiple diversified enrollment bit strings from the enrollment bit string,
  a hash unit arranged to obtain multiple reference hashes from the multiple diversified enrollment bit string and a cryptographic hash function, and
  a reference hash storage arranged to store the multiple reference hashes.

12. A biometric enroller device as in Clause 11, wherein
  the biometric enroller device has access to error probabilities assigned to bits of the enrollment bit string, the reference hash generator being arranged to generate multiple diversified enrollment bit string from the enrollment bit string and the error probabilities.

13. A biometric enroller device as in Clause 11 or 12, comprising
  an error-correcting helper data generator arranged to select a code word of an error correcting code for a diversified enrollment bit string, and determine error-correcting helper data for shifting the diversified enrollment bit string towards said selected code word.

14. A biometric system comprising the biometric verification device according to Clause 9 and the biometric enroller device according to Clause 11.

15. A biometric verification method (500) comparing a reference hash with a verification bit string obtained from a biometric, the biometric verification method comprising
  accessing error probabilities assigned to bits of the verification bit string, an error probability being indicative of a probability that the bit in the verification bit string corresponding to the error probability differs from a corresponding bit in an enrollment bit string, the enrollment bit string having previously been obtained by a biometric enrollment device from said biometric,
  generating candidate bit strings from the verification bit string and the error probabilities,
  applying a cryptographic hash function to said generated candidate bit strings to obtain candidate hashes,
  verifying if a candidate hash generated by the hash unit matches a reference hash stored in a reference storage, the reference storage storing at least one reference hash, the at least one reference hash being obtained by the enrollment device from the enrollment bit string and said cryptographic hash function.

16. A biometric enroller method (501) generating reference hashes from an enrollment bit string obtained from a biometric, the biometric enroller method comprising
  generating multiple diversified enrollment bit string from the enrollment bit string,
  obtaining multiple reference hashes from the multiple diversified enrollment bit string and a cryptographic hash function, and
  storing the multiple reference hashes.

17. A computer program comprising computer program code means adapted to perform all the steps of clauses 15 or 16 when the computer program is run on a computer.

18. A computer program as defined in clause 17 embodied on a computer readable medium.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

LIST OF REFERENCE NUMERALS IN FIGS. 1a-4b 100 a biometric verification device
110 a biometric sensor
120 a quantizer unit
130, 131 a candidate bit string generator
132 intermediate candidate bit string generator
133 error-correcting helper data application unit
134 error correcting unit
140 a hash unit
150 quantization helper data storage
160 a comparison unit
162 a reference hash storage
170 error probabilities storage
172 an input
200, 201 biometric enrollment device
220 a quantizer unit
222 quantization helper data storage
230 a reference hash generator
240 an error-correcting helper data generator
300 axis
310-350 quantization ranges
321 a center quantization range 320
322, 341, 341 a point in a quantization range
410 biometric verification data
420 verification bit string
430 candidate bit strings
440 candidate hashes
450 biometric enrollment data
460 enrollment bit string
462 diversified enrollment bit string
470 a code word
480 a reference hash

The invention claimed is:

1. A biometric verification device arranged to compare a reference hash with a verification bit string obtained from a biometric,
the biometric verification device having access to error probabilities assigned to bits of the verification bit string, an error probability being indicative of a probability that the bit in the verification bit string corresponding to the error probability differs from a corresponding bit in an enrollment bit string, the enrollment bit string having previously been obtained by a biometric enrollment device from said biometric,
the biometric verification device comprising:
a candidate bit string generator arranged to generate candidate bit strings from the verification bit string and the error probabilities;
a hash unit arranged to apply a cryptographic hash function to said generated candidate bit strings to obtain candidate hashes;
a reference storage arranged to store at least one reference hash, the at least one reference hash being obtained by the enrollment device from the enrollment bit string and said cryptographic hash function;
a comparison unit arranged to verify if a candidate hash generated by the hash unit matches a reference hash stored in the reference storage, wherein the biometric verification device is arranged to obtain biometric verification data from a biometric sensor, the biometric sensor being arranged to measure said biometric; and
a quantizer unit arranged to quantize the biometric verification data by mapping at least part of the biometric verification data to a point in a quantization range from a set of quantization ranges, a quantization range in the set of quantization ranges corresponding to a quantization bit string, the biometric verification device being arranged to string together one or more quantization bit strings obtained by the quantizer unit from the biometric verification data to form the verification bit string, wherein
the quantizer unit is further arranged to determine a distance between the point in the quantization range onto which the at least part of the biometric verification data is mapped and a closest edge of said quantization range and to assign an error probability to a corresponding bit in the verification bit string.

2. The biometric verification device as in claim 1, wherein the quantizer unit is arranged to apply quantization helper data to the at least part of the biometric verification data before mapping the at least part of the biometric verification data to the point in the quantization range.

3. The biometric verification device as in claim 1, wherein the biometric verification device has an input to receive error probabilities obtained by the biometric enrollment device.

4. The biometric verification device as in claim 1, wherein the candidate bit string generator is arranged to generate candidate bit strings having a total error probability less than an error probability threshold, the total error probability being determined from the error probabilities assigned to bits of the verification bit string.

5. The biometric verification device as in claim 1, wherein the candidate bit string generator is arranged to select a selection-number of bits in the verification bits string that have the largest assigned error probability, and to generate candidate bit strings in which the values of said selected bits are varied.

6. The biometric verification device as in claim 5, wherein
the selection-number is 1, or
the selection-number is 2, or
the selection-number is 3.

7. The biometric verification device as in claim 1, wherein
the reference storage is arranged to store the at least one reference hash with error-correcting helper data corresponding to the reference hash,
the biometric verification device comprises an error correcting unit arranged to apply an error correcting algorithm to a bit string,
the candidate bit string generator is arranged to
generate intermediate candidate bit strings from the verification bit string and the error probabilities, shift the intermediate candidate bit strings towards a code word of an error correcting code by applying error-correcting helper data to the intermediate candidate bit strings, applying the error correcting unit to said shifted intermediate candidate bit strings to obtain the candidate bit strings, and the comparison unit is arranged to for verifying if a candidate hash generated by the hash unit matches a reference hash corresponding to the error-correcting helper data applied to the intermediate candidate bit string from which the candidate hash was obtained.

8. The biometric verification device as in claim 1, wherein the reference storage is arranged to store multiple references hashes, the multiple reference hashes being obtained by the enrollment device.

9. The biometric verification device as in the combination of claim 7, wherein the reference storage is arranged to store the multiple references hashes with multiple corresponding error-correcting helper data.

10. A biometric system comprising the biometric verification device according to claim 8.

11. A biometric enrollment device arranged to generate multiple reference hashes from a biometric enrollment bit string obtained from a biometric, the biometric enrollment device comprising:
  a reference hash generator arranged to generate multiple diversified enrollment bit strings from the biometric enrollment bit string;
  a hash unit arranged to obtain the multiple reference hashes from the multiple diversified enrollment bit strings and a cryptographic hash function;
  a reference hash storage arranged to store the multiple reference hashes, wherein the biometric enrollment device is arranged to obtain biometric enrollment data from a biometric sensor, the biometric sensor being arranged to measure said biometric; and
  a quantizer unit arranged to quantize the biometric enrollment data by mapping at least part of the biometric enrollment data to a point in a quantization range from a set of quantization ranges, a quantization range in the set of quantization ranges corresponding to a quantization bit string, the biometric enrollment device being arranged to string together one or more quantization bit strings obtained by the quantizer unit from the biometric enrollment data to form the biometric enrollment bit string,
  wherein the quantizer unit is further arranged to determine a distance between the point in the quantization range onto which the at least part of the biometric verification data is mapped and a closest edge of said quantization range and to assign an error probability to a corresponding bit in the verification bit string, and
  wherein the biometric enrollment device has access to error probabilities assigned to bits of the enrollment bit string, the reference hash generator being arranged to generate the multiple diversified enrollment bit strings from the biometric enrollment bit string and the error probabilities.

12. A biometric enrollment device arranged to generate multiple reference hashes from a biometric enrollment bit string obtained from a biometric, the biometric enrollment device comprising:
  a reference hash generator arranged to generate multiple diversified enrollment bit strings from the biometric enrollment bit string;
  a hash unit arranged to obtain the multiple reference hashes from the multiple diversified enrollment bit strings and a cryptographic hash function;
  a reference hash storage arranged to store the multiple reference hashes, wherein the biometric enrollment device is arranged to obtain biometric enrollment data from a biometric sensor, the biometric sensor being arranged to measure said biometric;
  a quantizer unit arranged to quantize the biometric enrollment data by mapping at least part of the biometric enrollment data to a point in a quantization range from a set of quantization ranges, a quantization range in the set of quantization ranges corresponding to a quantization bit string, the biometric enrollment device being arranged to string together one or more quantization bit strings obtained by the quantizer unit from the biometric enrollment data to form the biometric enrollment bit string; and
  an error-correcting helper data generator arranged to select a code word of an error correcting code for a diversified enrollment bit string, and determine error-correcting helper data for shifting the multiple diversified enrollment bit strings towards said selected code word.

13. A biometric verification method comparing a reference hash with a verification bit string obtained from a biometric, the biometric verification method comprising acts of:
  obtaining biometric verification data from a biometric sensor;
  quantizing the biometric verification data by mapping at least part of the biometric verification data to a point in a quantization range from a set of quantization ranges, a quantization range in the set of quantization ranges corresponding to a quantization bit string, and stringing together one or more quantization bit strings obtained from the biometric verification data to form the verification bit string;
  accessing error probabilities assigned to bits of the verification bit string, an error probability being indicative of a probability that a bit in the verification bit string corresponding to the error probability differs from a corresponding bit in an enrollment bit string, the enrollment bit string having previously been obtained by a biometric enrollment device from said biometric, including determining a distance between the point in the quantization range onto which the at least part of the biometric verification data is mapped and a closest edge of said quantization range and to assign an error probability to a corresponding bit in the verification bit string;
  generating candidate bit strings from the verification bit string and the error probabilities;
  applying a cryptographic hash function to said generated candidate bit strings to obtain candidate hashes; and
  verifying if a candidate hash generated by the generating act matches a reference hash stored in a reference storage, the reference storage storing at least one reference hash, the at least one reference hash being obtained by the biometric enrollment device from the enrollment bit string and said cryptographic hash function.

14. A biometric enrollment method generating multiple reference hashes from an enrollment bit string obtained from a biometric, the biometric enrollment method comprising acts of:
  generating multiple diversified enrollment bit strings from the enrollment bit string;
  obtaining the multiple reference hashes from the multiple diversified enrollment bit string and a cryptographic hash function; and
  storing the multiple reference hashes.

15. A computer readable non-transitory media that includes a computer program that is configured to enable a programmable device when executing the computer program to perform a biometric verification method for comparing a reference hash with a verification bit string obtained from a biometric, the biometric verification method comprising acts of:

obtaining biometric verification data from a biometric sensor;

quantizing the biometric verification data by mapping at least part of the biometric verification data to a point in a quantization range from a set of quantization ranges, a quantization range in the set of quantization ranges corresponding to a quantization bit string, and stringing together one or more quantization bit strings obtained from the biometric verification data to form the verification bit string;

accessing error probabilities assigned to bits of the verification bit string, an error probability being indicative of a probability that a bit in the verification bit string corresponding to the error probability differs from a corresponding bit in an enrollment bit string, the enrollment bit string having previously been obtained by a biometric enrollment device from said biometric, including determining a distance between the point in the quantization range onto which the at least part of the biometric verification data is mapped and a closest edge of said quantization range and to assign an error probability to a corresponding bit in the verification bit string;

vgenerating candidate bit strings from the verification bit string and the error probabilities;

vapplying a cryptographic hash function to said generated candidate bit strings to obtain candidate hashes; and verifying if a candidate hash generated by the generating act matches a reference hash stored in a reference storage, the reference storage storing at least one reference hash, the at least one reference hash being obtained by the biometric enrollment device from the enrollment bit string and said cryptographic hash function.

16. A computer readable non-transitory media that includes a computer program that is configured to enable a programmable device when executing the computer program to perform a biometric enrollment method for generating multiple reference hashes from an enrollment bit string obtained from a biometric, the biometric enrollment method comprising acts of:

generating multiple diversified enrollment bit strings from the enrollment bit string;

obtaining the multiple reference hashes from the multiple diversified enrollment bit string and a cryptographic hash function; and storing the multiple reference hashes.

* * * * *